(12) United States Patent
Hussain et al.

(10) Patent No.: US 7,042,460 B2
(45) Date of Patent: May 9, 2006

(54) METHOD AND APPARATUS FOR RASTERIZING IN A HIERARCHICAL TILE ORDER

(75) Inventors: Zahid S. Hussain, San Carlos, CA (US); Timothy J. Millet, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/383,276

(22) Filed: Mar. 7, 2003

(65) Prior Publication Data

US 2003/0142103 A1 Jul. 31, 2003

Related U.S. Application Data

(63) Continuation of application No. 09/145,516, filed on Sep. 2, 1998, now Pat. No. 6,611,272.

(60) Provisional application No. 60/091,599, filed on Jul. 2, 1998.

(51) Int. Cl.
*G09G 5/39* (2006.01)
*G09G 5/36* (2006.01)
*G06F 12/00* (2006.01)

(52) U.S. Cl. .................. 345/545; 345/564; 345/531
(58) Field of Classification Search ............. 345/531, 345/545, 503, 564
See application file for complete search history.

(56) References Cited

U.S. PATENT DOCUMENTS

| 4,780,709 A | * | 10/1988 | Randall | 345/27 |
| 5,226,175 A | | 7/1993 | Deutsch et al. | 345/419 |
| 5,251,296 A | | 10/1993 | Rhoden et al. | 345/517 |
| 5,321,809 A | | 6/1994 | Aranda | 345/508 |
| 5,471,248 A | | 11/1995 | Bhargava et al. | 348/420 |

(Continued)

FOREIGN PATENT DOCUMENTS

EP 0 447 225 9/1991

OTHER PUBLICATIONS

Juan Pineda. A Parallel Algorithm for Polygon Rasterization. In Computer Graphics, vol. 22, No. 4, Aug. 1988, p. 17-20.*

(Continued)

*Primary Examiner*—Kee M. Tung
(74) *Attorney, Agent, or Firm*—Woodcock Washburn LLP (57) ABSTRACT

A method and apparatus for efficiently rasterizing graphics is provided. The method is intended to be used in combination with a frame buffer that provides fast tile-based addressing. Within this environment, frame buffer memory locations are organized into a tile hierarchy. For this hierarchy, smaller low-level tiles combine to form larger mid-level tiles. Mid-level tiles combine to form high-level tiles. The tile hierarchy may be expanded to include more levels, or collapsed to included fewer levels. A graphics primitive is rasterized by selecting an starting vertex. The low-level tile that includes the starting vertex is then rasterized. The remaining low-level tiles that are included in the same mid-level tile as the starting vertex are then rasterized. Rasterization continues with the mid-level tiles that are included in the same high-level tile as the starting vertex. These mid-level tiles are rasterized by rasterizing their component low-level tiles. The rasterization process proceeds bottom-up completing at each lower level before completing at higher levels. In this way, the present invention provides a method for rasterizing graphics primitives that accesses memory tiles in an orderly fashion. This reduces page misses within the frame buffer and enhances graphics performance.

4 Claims, 4 Drawing Sheets

U.S. PATENT DOCUMENTS

| | | | | |
|---|---|---|---|---|
| 5,598,517 A | * | 1/1997 | Watkins | 345/441 |
| 5,729,672 A | | 3/1998 | Ashton | 345/429 |
| 5,815,168 A | * | 9/1998 | May | 345/572 |
| 5,852,443 A | * | 12/1998 | Kenworthy | 345/441 |
| 5,977,977 A | | 11/1999 | Kajiya et al. | 345/418 |
| 5,982,384 A | * | 11/1999 | Prouty et al. | 345/441 |
| 5,990,912 A | | 11/1999 | Swanson | 345/516 |
| 6,111,583 A | | 8/2000 | Yaron et al. | 345/421 |
| 6,144,392 A | | 11/2000 | Rogers | 345/511 |
| 6,215,507 B1 | * | 4/2001 | Nally et al. | 345/568 |
| 6,246,415 B1 | * | 6/2001 | Grossman et al. | 345/422 |
| 6,433,782 B1 | * | 8/2002 | Nakatsuka et al. | 345/426 |

OTHER PUBLICATIONS

Greene, N., "Hierarchical Polygon tiling with Coverage Masks", *Proceedings of the 23$^{rd}$ Annual Conference on Computer Graphics*, 1996, 65-74.

McCormack, J. et al., "Neon: A Single-Chip 3D Workstation Graphics Accelerator", *Proceedings of the 1998 Eurographics/SIGGRAPH Workshop*.

Montrym, J. et al., "InfiniteReality: A Real-Time Graphics System", *Proceedings of the 24$^{th}$ Annual Conference on Computer Graphics & Interactive Techniques*, 1997, 293-302.

* cited by examiner

METHOD AND APPARATUS FOR RASTERIZING IN A HIERARCHICAL TILE ORDER

CROSS REFERENCE TO RELATED APPLICATIONS

This application is a continuation of U.S. patent application Ser. No. 09/145,516 filed Sep. 2, 1998 now U.S. Pat. No. 6,611,272 which claims benefit of 60/091,599 filed Jul. 2, 1998, the entirety of which is incorporated herein by reference.

RELATED APPLICATIONS

The following application claims the benefit of U.S. Provisional Application Ser. No. 60/091,599 entitled "Method and Apparatus for Rasterizing in a Hierarchical Tile Order" by Zahid S. Hussain and Timothy J. Millet, filed Jul. 2, 1998, the disclosure of which is incorporated in this document by reference.

FIELD OF THE INVENTION

The present invention relates generally to systems for computer graphics. More specifically, the present invention includes a method and apparatus for efficiently rasterizing graphics primitives.

BACKGROUND OF THE INVENTION

Computer systems (and related devices) typically create three-dimensional images using a sequence of stages known as a graphics pipeline. During early pipeline stages, images are modeled using a mosaic-like approach where each image is composed of a collection of individual points, lines and polygons. These points, lines and polygons are known as primitives and a single image may require thousands, or even millions, of primitives. Each primitive is defined in terms of its shape and location as well as other attributes, such as color and texture.

The primitives used in early pipeline stages are transformed, during a rasterization stage, into collections of pixel values. The rasterization stage is often performed by a specialized graphics processor (in low-end systems, rasterization may be performed directly by the host processor) and the resulting pixel values are stored in a device known as a frame buffer. A frame buffer is a memory that includes a series of randomly accessible memory locations. Each memory location in the frame buffer defines a corresponding pixel included in an output device where the image will ultimately be displayed. To define its corresponding pixel, each memory location includes a series of bits. Typically, these bits are divided into separate portions defining red, blue and green intensities. Each memory location may also include depth information to help determine pixel ownership between overlapping primitives.

During the rasterization stage, the graphics processor renders each primitive into the frame buffer. The graphics processor accomplishes this task by determining which frame buffer memory locations are included within the bounds of each primitive. The included memory locations are then initialized to reflect the attributes of the primitive, including color and texture.

The rasterization stage is followed by a display stage where a display controller transforms the pixel values stored in the frame buffer into signals that drive the output device being used. The display controller accomplishes this task by scanning the memory locations included in the frame buffer. The red, blue and green portions of each location are converted into appropriate output signals and sent to the output device.

The throughput of a graphics pipeline is highly dependent on frame buffer performance. This follows because the frame buffer functions as a middleman between the rasterization stage and the display stage. As a result, the frame buffer becomes the focus of repeated memory accesses by both the graphics processor and the display controller. The number of these accesses may be quite large. The frame buffer must be able to sustain a high rate of these accesses if it is to avoid becoming a performance bottleneck.

Frame buffers are typically fabricated using arrays of dynamic random access memory (DRAM) components. Compared to other technologies, such as static random access memories (SRAMs), DRAM components represents a better trade off between performance and cost. At the same time, achieving acceptable frame buffer performance may be far more complicated when DRAM components are used. The complexity involved in DRAM use stems from the addressing scheme used by these components. For this scheme, memory locations are addressed using a combination of a row address and a column address. Row and column addresses are supplied in sequence—row address first, column address second. Depending on the specific type of DRAM components used, this two-step addressing scheme may be too time consuming to sustain the memory access rate required for frame buffer use.

Fortunately, many DRAM components also provide a faster page addressing mode. For this mode, a sequence of column addresses may be supplied to a DRAM component after the row address has been supplied. Accesses within a row require only a single address. The overall effect is that accessing a DRAM component is much faster when a series of accesses is confined to a single row. Accessing a location included in a new row, referred to as a page miss, is much slower.

For this reason, frame buffers are often designed to maximize consecutive accesses within DRAM rows and to minimize page misses. One way in which this is accomplished is to structure the frame buffer so that graphics primitives tend to map to a single DRAM row or a small number of DRAM rows. Memory tiling is an example of this type of frame buffer structuring. In frame buffers that use memory tiling, the memory locations included in a DRAM row map to a rectangular block of pixels. This contrasts with more typical frame buffer construction where DRAM rows map to lines of pixels. Memory tiling takes advantage of the fact that many primitives fit easily into blocks and that few fit easily into lines. In this ways memory tiling reduces page misses by increasing the chances that a given primitive will be included within single DRAM row or a small number of DRAM rows.

Another way to maximize consecutive accesses within DRAM rows and to minimize page misses is to position a cache memory between the graphics processor and the frame buffer. The cache memory collects accesses performed by the graphics processor and forwards them to the cache on a more efficient row-by-row basis.

Memory tiling and cache memories are both effective techniques for improving the performance of DRAM based frame buffers. Unfortunately, the rasterization technique used within most frame buffers does not fully exploit the full potential of memory tiling or cache memories used in combination with memory tiling. This follows because rasterization is typically performed on a line-by-line basis. When used in a tiled frame buffer, line-by-line rasterization effectively ignores the tiled structure of the frame buffer. As a result, a given rasterization may alternately access and re-access a given set of tiles. This results in an increased number of DRAM page misses and decreases the throughput of the frame buffer and graphics pipeline. As a result, there is a need for rasterization methods that more effectively exploit the full potential of memory tiling and cache memories used in combination with memory tiling.

SUMMARY OF THE INVENTION

An embodiment of the present invention includes a method and apparatus for efficiently rasterizing graphics primitives. In the following description, an embodiment of the present invention will be described within the context of a representative graphics pipeline. The graphics pipeline is a sequence of components included in a host computer system. This sequence of components ends with a frame buffer followed by a display controller.

The frame buffer is a random access memory device that includes a series of memory locations. The memory locations in the frame buffer correspond to pixels included in an output device, such as a monitor. Each memory location includes a series of bits with the number and distribution of bits being implementation dependent. For the purpose of description, it may be assumed that each memory location includes four eight bit bytes. Three of these bytes define red, blue and green intensities, respectively. The fourth byte, alpha, defines the pixel's coverage or transparencies.

The memory locations included in the frame buffer are preferably organized using a tiled addressing scheme. For this scheme, the memory locations included in the frame buffer are organized to correspond to rectangular tiles of pixels included in the output device. The number of pixels (and the number of frame buffer memory locations) included in a single tile may vary between different frame buffer implementations. In most cases, the tile size will be a power of two. This provides a convenient scheme where more significant address bits choose a specific tile and less significant address bits choose an offset within the specific tile. In cases where the frame buffer is fabricated using DRAM or DRAM-like memory components it is preferable for each tile to map to some portion of DRAM row. Thus, each DRAM row includes one or more memory tiles.

The display controller scans the memory locations included in the frame buffer. For each location scanned, the display controller converts the red, blue and green intensities into appropriate output signals. The display controller sends these output signals to the output device being used. The display controller continually repeats this scanning process. In this way, the contents of the frame buffer are continuously sent to the output device.

The graphics processor rasterizes graphics primitives into the frame buffer. To accomplish this task, the graphics processor determines which frame buffer memory locations are included within the bounds of each primitive. The included memory locations are then initialized to reflect the attributes of the primitive, including color and texture. During rasterization, the graphics processor uses a hierarchy of memory tiles. Within this hierarchy, smaller tiles are grouped into larger tiles. These larger tiles may be grouped, in turn, into still larger tiles. For a representative embodiment of the present invention, the tile hierarchy includes three levels. The lowest level of the hierarchy is made up of four pixel by four pixel low-level tiles. These four-by-four tiles are grouped into eight-by-eight mid-level tiles and the eight-by-eight tiles are grouped into sixteen-by-sixteen high-level tiles.

The graphics processor begins the process of rasterizing a primitive by selecting one of the primitive's vertices as a starting vertex. The graphics processor then rasterizes the low-level tile that includes the starting vertex. When rasterization of the first low-level tile is complete, the graphics processor moves left-to-right, top-to-bottom through the remaining low-level tiles that are included in same mid-level tile as the first low-level tile. The graphics processor rasterizes each of these low-level tiles that include pixels within the primitive. When the last of these low-level tiles has been rasterized, the graphics processor has completely rasterized the first mid-level tile.

When rasterization of the first mid-level tile is complete, the graphics processor moves left-to-right, top-to-bottom through the remaining mid-level tiles that are included in same high-level tile as the first mid-level tile. The graphics processor rasterizes each of these mid-level tiles that include pixels within the primitive by repeating the method used to rasterize the first mid-level tile (i.e., by rasterizing their component low-level tiles). When the last of these mid-level tiles has been rasterized, the graphics processor has completely rasterized the first high-level tile.

When rasterization of the first high-level tile is complete, the graphics processor moves left-to-right, top-to-bottom through the remaining high-level tiles that span the primitive. The graphics processor rasterizes each of these high-level tiles by repeating the method used to rasterize the first high-level tile (i.e., by rasterizing their component low-level tiles which are rasterized, in turn, by rasterizing their component low-level tiles). When the last of these high-level tiles has been rasterized, the graphics processor has completely rasterized the primitive.

Effectively, the primitive is rasterized in a bottom-up fashion. The graphics processor rasterizes low-level tiles, mid-level tiles and high-level tiles, completing rasterization at each level before moving up the hierarchy. The use of the tile hierarchy increases the temporal locality of accesses within a given memory tile. Increasing temporal locality reduces between tile access. For frame buffers that support fast tile-based access, this enhances graphics throughput. The increased temporal locality of accesses within a given memory tile may also enhance cache memory performance. This is particularly true in cases where cache memory/frame buffer interaction is performed on a tile-by-tile basis.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
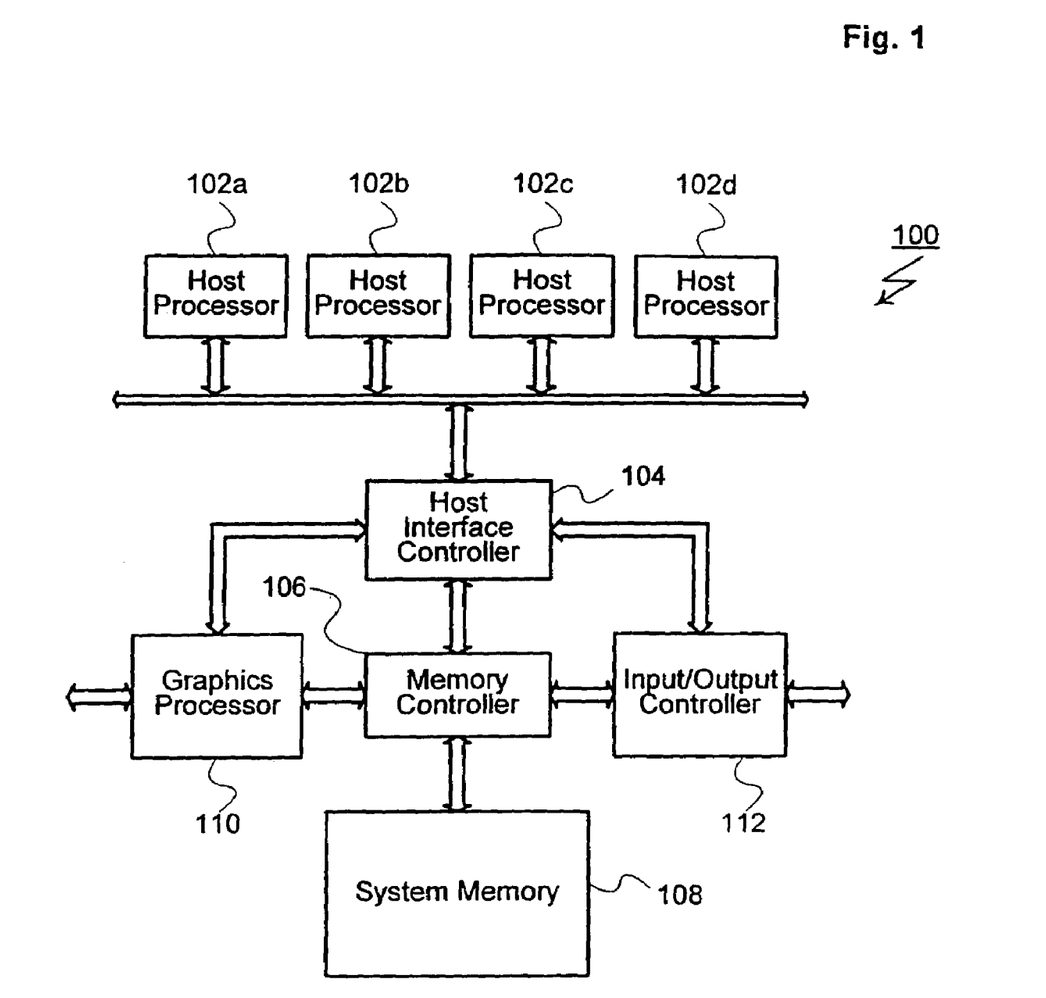
FIG. 1 is a block diagram of a host computer system shown as an exemplary environment for an embodiment of the present invention.

In FIG. 1, a host computer system 100 is shown as a representative environment for the present invention. Structurally, host computer system 100 includes a host processor, or host processors, of which host processors 102a through 102d are representative. Host processors 102 represent a wide range of commercially available or proprietary types. Host computer system 100 may include either more or fewer host processors 102 than the four shown for the representative environment of host computer system 100.

Host processors 102 are connected to a sequence of components beginning with a memory request unit 104 followed by a memory controller 106. Memory controller 106 is followed by a system memory 108. Host processors 102 use this sequence of components to access memory locations included in system memory 108. As part of these accesses, host processors 102 send virtual memory access requests to memory request unit 104. Memory request unit 104 translates the requests into corresponding physical memory access requests. The physical memory access requests are then passed to memory controller 106. Memory controller 106 then accesses system memory 108 to perform the requested operations. For the described embodiment, memory controller 106 and system memory 108 support a range of page types, including tiled and linear pages. Memory controller 106 and system memory 108 also support a range of page sizes for both tiled and linear pages.

Memory controller 106 also functions as an interface that allows other components to access system memory 108. In FIG. 1, memory controller 106 provides this type of interface to graphics processor 110 and input/output controller 112. Preferably, graphics processor 110 performs the majority of its processing using the memory included in system memory 108. This avoids the delays that result if graphics primitives or data are moved from system memory 108 to graphics processor 110. Input/output controller 112 functions as a channel allowing host computer system 100 to be connected to a wide range of input/output devices, such as disk drives, non-volatile storage systems, keyboards, modems, network adapters, and printers.

As mentioned, host computer system 100 is shown as a representative environment for the present invention. Additional details of this representative environment are discussed in U.S. Pat. No. 6,104,417, entitled "A Unified Memory Computer Architecture With Dynamic Graphics Memory Allocation" of Michael J. K. Nielsen and Zahid S. Hussain. It should be appreciated, however, that the present invention is equally applicable to a range of computer systems and related devices and is not limited to the representative environment of host computer system 100.

Figure 2:
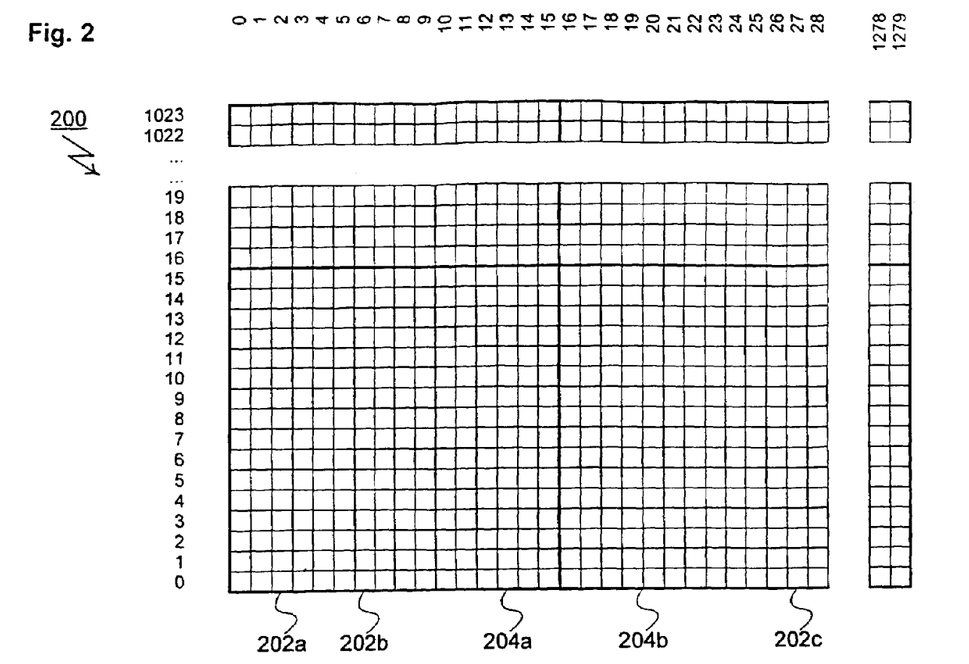
FIG. 2 is a block diagram of a frame buffer in accordance with an embodiment of the present invention.

Graphics processor 110 uses one or more frame buffers of the type shown in FIG. 2 and generally designated 200. Frame buffer 200 is a random access memory device and includes a series of memory locations of which memory locations 202a, 202b and 202c are representative. Each memory location 202 corresponds to a single pixel included in an output device, such a monitor or video display. Memory locations 202 are arranged into a series of rows and columns. For the specific embodiment shown in FIG. 2, 1024 rows and 1280 columns are included. This corresponds to a monitor having 1024 rows and 1280 columns of pixels. Each memory location 202 includes a series of bits with the number and distribution of bits being implementation dependent. For the purpose of description, it may be assumed that each memory location 202 includes four eight bit bytes. Three of these bytes define red, blue and green intensities, respectively. The fourth byte included in each memory location 202, is referred to as alpha and defines the pixel's coverage or transparencies.

Frame buffer 200 is typically fabricated using an array of memory components. These components may be selected from appropriate DRAM types, including VRAM and SDRAM types. For the specific embodiment of host computer system 100, frame buffer 200 is dynamically allocated within system memory 108. In other architectures, frame buffer 200 may be included within other suitable locations, such as graphics processor 110.

Frame buffer 200 preferably includes a series of memory tiles of which memory tiles 204a and 204b are representative. Each memory tile 204 includes a series of memory locations 202 arranged as a rectangle. The size of memory tiles 204 is largely implementation dependent. Thus, frame buffer 200 may be configured to include large or small memory tiles 204. The dimensions of memory tiles 204 are also largely implementation dependent. Thus, frame buffer 200 may include tall or wide memory tiles 204. Even more generally, some implementations may allow frame buffer 200 to include a mixture of memory tiles 204 having a range of sizes and dimensions. For the specific embodiment shown in FIG. 2, each memory tile 204 includes a total of two-hundred and fifty-six memory locations 202 arranged as a sixteen-by-sixteen square.

Frame buffer 200 preferably uses an addressing scheme where more significant address bits choose a specific memory tile 204 and less significant address bits choose a specific memory location 202 within the selected memory tile 204. In cases where frame buffer 200 is fabricated using DRAM or DRAM-like memory components it is preferable for each memory tile 204 to map to some portion of DRAM row. Thus, each DRAM row includes one or more memory tiles 204. This allows memory locations within a memory tile 204 to be accessed using a single DRAM row address. For DRAM components that provide some type of fast intra-row accessing mode (such as page mode access) this allows memory locations 202 included within a tile to be rapidly accessed in succession.

Tile Hierarchy

Within frame buffer 200, memory tiles 204 represent the highest level in a tile hierarchy. Other levels of this hierarchy are shown more clearly in FIG. 3 where a memory tile 204 is shown to include four mid-level tiles 300a through 300d. In turn, each mid-level tile 300 includes four low-level tiles 302a through 302d. The overall result is that a three level hierarchy is formed. Within this hierarchy four-by-four low-level tiles 302 are grouped into eight-by-eight mid-level tiles 300 and eight-by-eight mid-level tiles 300 are grouped into sixteen-by-sixteen memory tiles 204. Other hierarchies, including more or fewer levels, are equally possible.

Rasterization Method

An embodiment of the present invention provides a method for efficiently rasterizing graphics primitives. The rasterization method is intended to work in combination with a wide range of graphics primitive types, including points, lines and polygons.

Figure 3:
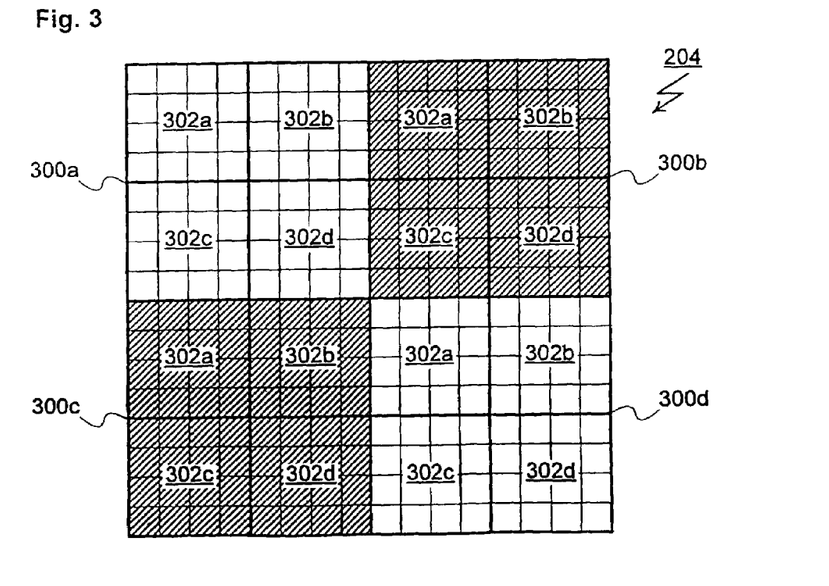
FIG. 3 is a block diagram of a memory tile in accordance with an embodiment of the present invention.

Graphics processor,110 begins the process of rasterizing a primitive by selecting one of the primitive's vertices as a starting vertex. Graphics processor 110 then rasterizes the low-level tile 302 that includes the starting vertex. When rasterization of the first low-level tile 302 is complete, graphics processor 110 moves left-to-right, top-to-bottom through the remaining low-level tiles 302 that are included in same mid-level tile 300 as the first low-level tile 302. Graphics processor 110 rasterizes each of these low-level tiles 302 that include pixels within the primitive. When the last of these low-level tiles 302 has been rasterized, graphics processor 110 has completely rasterized the first mid-level tile 300.

When rasterization of the first mid-level tile 300 is complete, graphics processor 110 moves left-to-right, top-to-bottom through the remaining mid-level tiles 300 that are included in same memory tile 204 as the first mid-level tile 300. Graphics processor 110 rasterizes each of these mid-level tiles 300 that include pixels within the primitive by repeating the method used to rasterize the first mid-level tile 300 (i.e., by rasterizing their component low-level tiles 302). When the last of these mid-level tiles 300 has been rasterized, graphics processor 110 has completely rasterized the first memory tile.

When rasterization of the first memory tile 204 is complete, graphics processor 110 moves left-to-right, top-to-bottom through the remaining memory tiles 204 that span the primitive. Graphics processor 110 rasterizes each of these memory tiles 204 by repeating the method used to rasterize the first memory tile 204 (i.e., by rasterizing their component low-level tiles 302 which are rasterized, in turn, by rasterizing their component low-level tiles 302). When the last of these memory tiles 204 has been rasterized, graphics processor 110 has completely rasterized the primitive.

Figure 4:
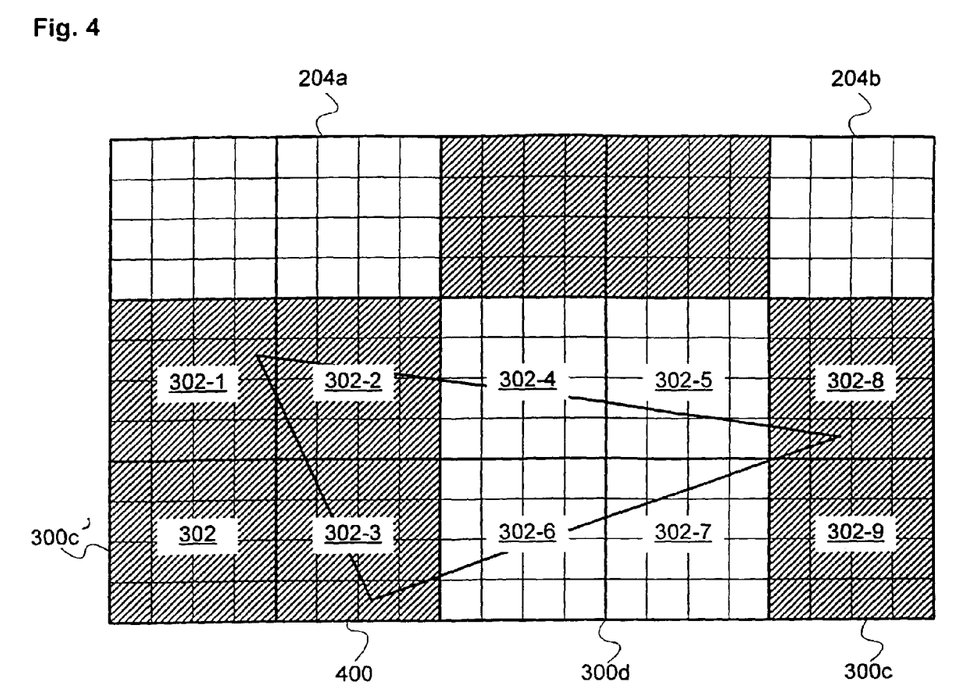
FIG. 4 is a block diagram of an exemplary graphics primitive overlaying a frame buffer to further describe an embodiment of the present invention.

To better describe the rasterization method, FIG. 4 shows an exemplary primitive 400 overlaying a portion of frame buffer 200. Primitive 400 is a triangular polygon. This particular shape is chosen to be representative of primitives in general, with the understanding that the present invention is equally amenable to other primitive shapes and types. As shown in FIG. 4, primitive 400 is spanned by two memory tiles 204a and 204b.

To begin rasterizing primitive 400, graphics processor 110 selects a starting vertex from the vertices of primitive 400. In general, the choice of vertex is somewhat arbitrary—meaning that the present invention may be adapted to initiate rasterization at any given point. To simplify the following description it is assumed however, that graphics processor 110 selects the upper left vertex of primitive 400 as the starting vertex.

After selecting the starting vertex, graphics processor 110 rasterizes the pixels in low-level tile 302 marked 1. Rasterization starts at this location because low-level tile 302-1 includes the starting vertex. After rasterizing low-level tile 302-1, graphics processor 110 moves left-to-right, top-to bottom within the mid-level tile 300 that includes the low-level tile 302-1. Graphics processor 110 rasterizes each low-level tile 302 within this mid-level tile that includes pixels in primitive 400. Specifically, graphics processor 110 moves right and rasterizes low-level tile 302-2, and down to rasterize low-level tile 302-3.

At this point, graphics processor 110 has completely rasterized the first mid-level tile 300 (the final low-level tile 302 included within this mid-level tile 300 is completely outside of the boundaries of primitive 400). To continue the rasterization process, graphics processor 110 jumps to low-level tile 302-4 in the next mid-level tile 300. Graphics processor 110 selects mid-level tiles 300 using the same left-to-right, top-to-bottom pattern used to traverse low level tiles 302. After rasterizing low-level tile 302-4, graphics processor 110 moves left-to-right, top-to-bottom within the mid-level tile 300 that includes the low-level tile 302-4. Specifically, graphics processor 110 moves right and rasterizes low-level tile 302-5, down and left to rasterize low-level tile 302-6,and right to rasterize low-level tile 302-7.

At this point, graphics processor 110 has completely rasterized the first memory tile 204a (the remaining mid-level tiles 302 and their included low-level tiles 302 are completely outside of the boundaries of primitive 400). To continue the rasterization process, graphics processor 110 jumps to low-level tile 302-8 in the next memory tile 204b. Graphics processor 110 selects memory tiles 204 using the same left-to-right, top-to-bottom pattern used to traverse mid-level tiles 300 and low level tiles 302. After rasterizing low-level tile 302-8, graphics processor 110 moves left-to-right, top-to-bottom within the mid-level tile 300 that includes the low-level tile 302-8. Specifically, graphics processor 110 moves down and rasterizes low-level tile 302-9. By rasterizing low-level tile 302-9, graphics processor 110 completes rasterization of primitive 400.

In the preceding description, graphics processor 110 selects memory tiles 204, mid-level tiles 300 and low-level tiles 302 using a left-to-right, top-to-bottom traversal. In general, it should be appreciated that this particular pattern of traversal is only one of many possible patterns. In fact, the present invention may be adapted for use with any pattern that ensures that rasterization is completed at each lower level before proceeding to higher hierarchical levels. It should also be apparent that different patterns of traversal may be used at different hierarchical levels. Thus, graphics processor 110 may traverse memory tiles 204 using a first pattern of traversal, mid-level tiles 300 using a second pattern of traversal and low-level tiles 302 using a third pattern of traversal.

The preceding description also assumes that graphics processor 110 modifies the pattern of traversal to exclude memory tiles 204, mid-level tiles 300 and low-level tiles 302 that fall entirely outside of a primitive being rasterized. To accomplish this modification, graphics processor 110 is preferably configured to include a lookahead mechanism. The lookahead mechanism determines, as the graphics processor 110 is rasterizing a given low-level tile 302, which low-level tile should be rasterized next. The lookahead mechanism is preferably configured to ignore memory tiles 204, mid-level tiles 300 and low-level tiles 302 that fall entirely outside of a primitive being rasterized. It should be appreciated however, that this type of mechanism, while preferable, is not required. Thus, graphics processor 110 may be configured to exhaustively traverse low-level tiles 302 within mid-level tiles 300 or mid-level tiles 300 within memory tiles 204.

Graphics processor 110 uses the tile hierarchy to control the order in which low-level tiles 302 are selected during rasterization of graphics primitives. To maximize the efficiency of this ordering, graphics processor 110 is preferably configured to rasterize the sixteen memory locations 202 within a selected low-level tile 302 in a concurrent, or nearly concurrent fashion. For the described embodiment, graphics processor 110 achieves this concurrency by defining each edge of each primitive using a linear expression of the form: $F(x,y)=Ax+By+C$. Use of these equations means that all points on one side of an edge have $F(x,y) \geq 0$. All points on the other side of the same edge have $F(x,y) \leq 0$. To rasterize a low-level tile 302 for a given primitive, graphics processor 110 calculates each of the primitive's edge functions for each memory location 202 within the low-level tile 302. For example, for a triangular primitive bounded by edges $F(x,y)$, $F'(x,y)$ and $F''(x,y)$, graphics processor 110 would calculate each of these equations for each memory location 202 within the low-level tile 302 being rasterized. Graphics processor 110 determines that a memory location 202 is within a triangular primitive if an odd number of the primitive's edge functions are less than zero at the memory location 202.

Figure 5:
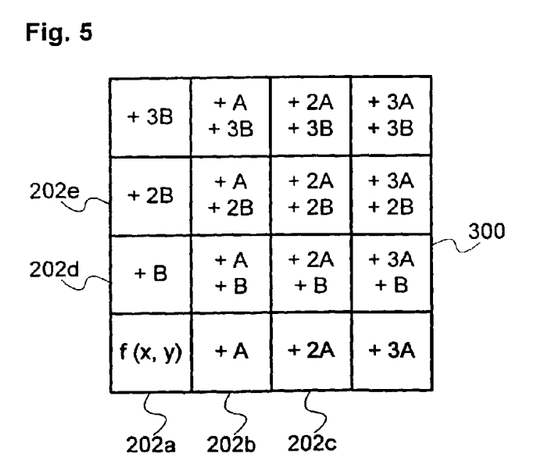
FIG. 5 is a block diagram showing the value of an edge function computed for each of the memory locations in a low-level tile.

Graphics processor 110 preferably uses an additive process to evaluate edge functions for all of the memory locations 202 of a low-level tile 302 in a concurrent, or nearly concurrent, fashion. The additive process may be better understood by reference to FIG. 5. FIG. 5 shows the values calculated by graphics process 110 for the memory locations 202 included in a low-level tile 302. As shown, graphics processor 110 calculates the value $F(x,y)$ for memory location 202a located at the lower, left hand corner of low-level tile 302. Graphics processor 110 calculates the value $F(x,y)+A$ for memory location 202b located one location to the right of memory location 202a, $F(x,y)+2A$ for memory location 202c located two locations to the right of memory location 202a, and so on. Effectively, graphics processor 110 calculates edge functions for each memory location 202 to the right of memory location 202a by adding multiples of the constant A to the edge function calculated for memory location 202a. In a similar fashion, graphics processor 110 calculates edge functions for each memory location 202 above memory location 202a by adding multiples of the constant B to the edge function calculated for memory location 202a. Memory locations that are both to the right of, and above, memory location 202a have values calculated by adding appropriate multiples of A and B. The overall result is that graphics processor 110 need only calculate $F(x,y)$, $F'(x,y)$ and $F''(x,y)$ once per low-level tile 302. The calculated values are then extrapolated using a series of additions to all of the memory locations included in the low-level tile 302.

Apparatus

Figure 6:
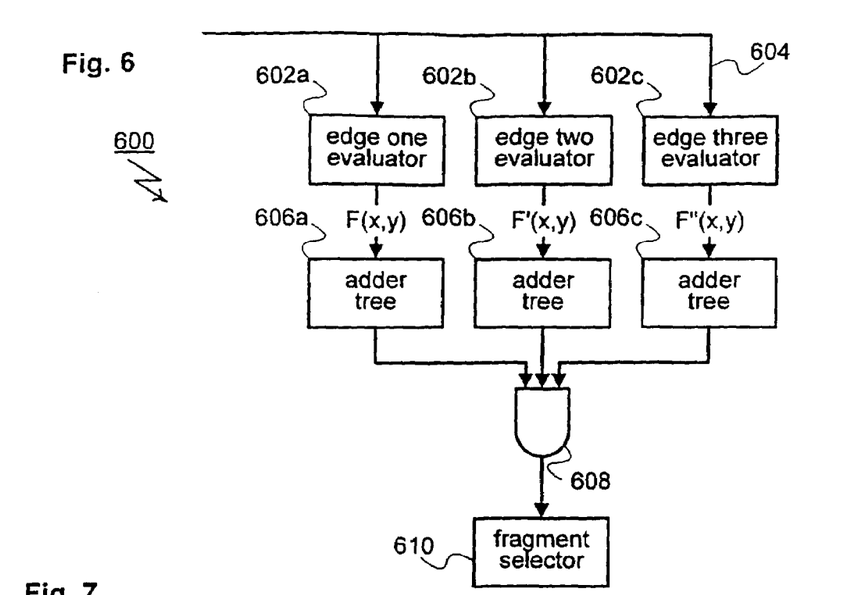
FIG. 6 is a block diagram of a rasterization apparatus in accordance with an embodiment of the present invention.

The previously described methods are adaptable for use in a wide range of hardware and software environments. Typically, however, these methods are most efficient when they are fully or partially implemented within a specialized rendering apparatus. An apparatus of this type is shown in FIG. 6 and generally designated 600.

Rendering apparatus 600 includes a set of three edge evaluators 602a through 600c. Each edge evaluator is connected by an input and control bus 604 to the remaining logic of graphics processor 110. Each edge evaluator 602 is also connected to a respective adder tree 606a through 606c. Adder trees 606 are connected, in turn, to an and gate 608. The output of and gate 608 is connected to a fragment selection unit 610.

Each edge evaluator 602 is configured to accept a set of parameters that characterize a linear equation of the form $F(x,y)=Ax+By+C$ from graphics processor 110. The parameters include an initial value for the equation and appropriate values for A and B. Graphics processor 110 sends these parameters to edge evaluators 602 using input and control bus 604. Once initialized, edge evaluators 602 are configured to compute successive values for their associated edge equation. Edge evaluators 602 compute these values by adding A or B to their initial values as appropriate.

Before rasterizing a given primitive, graphics processor 110 computes initial values for each of the edge functions that describe the primitive. Graphics processor 110 computes these initial values using the x and y coordinates of the first memory location 204 within the initial low-level tile 302 that will be rasterized (i.e., the low-level tile that includes the starting vertex). Graphics processor 110 then initializes edge evaluators 602 to include the initial values and appropriate values for A and B.

Once initialization is complete, edge evaluators 602 output the value of their associated edge functions (i.e., the initial values computed for the first memory location 204 within the initial low-level tile 302 that will be rasterized). These output of each edge evaluator 602 is passed to a respective adder tree 606. Each adder tree 606 performs a series of additions to create a set of sixteen output values. The output values are equivalent to the values shown in FIG. 5. In this way, each adder tree 606 re-computes the value it received from its associated edge evaluator for each x and y location within the low-level memory tile 302 being rasterized.

And gate 608 combines the three sets of sixteen values produced by the three adder trees 606. The result is a single set of sixteen values. The single set of output values shows which memory locations 204 within the low-level tile 302 being rasterized are included within the primitive. The set of sixteen output values are passed to fragment selection unit 610.

To continue the rasterization process, graphics processor 110 repeatedly directs edge evaluators 602 to reevaluate their output functions to reflect movement of the rasterization process to additional low-level tiles 302. For each additional low-level tile 302, adder trees 606 apply the reevaluated function to each of the memory locations 204 within the low-level tile 302 being rasterized. And gate 608 combines the values produced by adder trees 606 to produce unified sets of values showing the memory locations 204 that are included in the primitive being rasterized.

Figure 7:
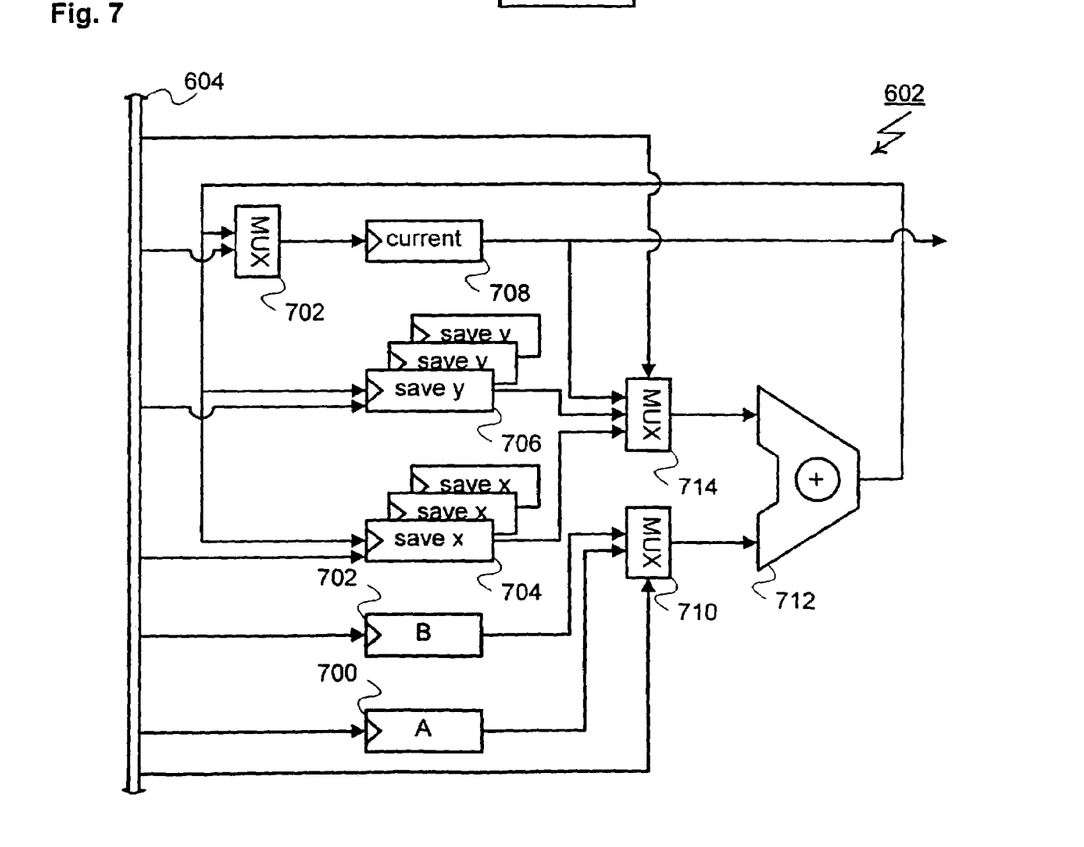
FIG. 7 is a block diagram of a edge evaluator in accordance with an embodiment of the present invention.

Details of edge evaluators 602 are better appreciated by reference to FIG. 7. In FIG. 7, it may, be seen that edge evaluator 602 includes A register 700 and B register 702. These registers are used to store values for A and B, respectively. Edge evaluator 602 also includes X save registers 704 and Y save registers 706. As will be described in more detail, these registers are used to store checkpointed output values of edge evaluator 602 at specific times during the rasterization process. X save registers 704 and Y save registers 706 are register sets. Each set includes one register for each level in the tile hierarchy being used. For the described embodiment, this means that there are three registers in both X save registers 704 and Y save registers 706. Edge evaluator 602 also includes a current register 708. Current register 708 it used to store the current value of the edge function associated with edge evaluator 602 (i.e., the current value of $F(x,y)=Ax+By+C$).

The outputs of A register 700 and B register 702 are connected to the data inputs of a step direction multiplexer 710. The control input of step direction multiplexer 710 is connected to input and control bus 604. This allows graphics processor 110 to select the output of step direction multiplexer 710 as either the output of A register 700 or B register 702. The output of step direction multiplexer 710 is connected to a first input of an adder 712.

The outputs of X save registers 704, Y save registers 706 and current register 708 are connected to the data inputs of a current/restore multiplexer 714. The control input of current/restore multiplexer 714 is connected to input and control bus 604. This allows graphics processor 110 to select the output of current/restore multiplexer 714 as either the output of X save registers 704, Y save registers 706 or current register 708. The output of current/restore multiplexer 714 is connected to a second input of adder 712.

The output of adder 712 is connected to a first data input of an initialization multiplexer 716. The second data input of initialization multiplexer and the control input of data initialization multiplexer 716 are connected to input and control bus 604. This allows graphics processor 110 to select the output of initialization multiplexer 716 as either the output of adder 712 or a value specified by graphics processor 110.

The output of adder 712 is also connected to the inputs of X save registers 704 and Y save registers 706. Write enable inputs for X save registers 704 and Y save registers 706 are connected to input and control bus 604. This allows graphics processor 110 to selectively save the output of select the output of adder 712 in either X save registers 704 or Y save registers 706.

The inputs of A register 700 and B register 702 are connected to input and control bus 604. This allows graphics processor 110 to initialize A register 700 and B register 702 to include values for A and B, respectively.

To initialize edge evaluator 602, graphics processor 110 computes an initial value for the edge function $F(x,y)=Ax+By+C$. As discussed, graphics processor 110 computes this initial value using the x and y coordinates of the first memory location 204 within the initial low-level tile 302 to be rasterized (i.e., the low-level tile that includes the starting vertex). Graphics processor 110 then uses input and control bus 604 to store the initial value in current register 708. Graphics processor 110 also uses input and control bus 604 to store the values A and B in A register 700 and B register 702, respectively. At the completion of initialization, the output of edge evaluator 602 is the initial value for the edge function computed by graphics processor 110.

To continue the rasterization process, graphics processor 110 uses input and control bus 604 to cause step direction multiplexer 710 to select A register 700 or B register 702. A register 700 is selected to cause edge evaluator 602 to reevaluate the initial value in current register 708 by adding A or B. The reevaluated value is stored in current register 708 and becomes the current output of edge detector 602. Effectively, by selecting A register 700 or B register 702 and reevaluating the initial value, graphics processor 110 causes edge evaluator 602 to move the rasterization process one by low-level tile 302. The movement may be left-to-right (when A register 700 is selected) or top-to-bottom (when B register 702 is selected)

CONCLUSION

The use of the tile hierarchy ensures that rasterization within a given memory tile 204 is completed before rasterization within another memory tile 204 is initiated. This increases the temporal locality of accesses within memory tiles 204 during the rasterization process. For frame buffers that support fast tile-based access, this enhances graphics throughput. The increased temporal locality of accesses within a given memory tile 204 may also enhance cache memory performance. This is particularly true in cases where cache memory/frame buffer interaction is performed on a tile-by-tile basis. In this way, the present invention provides an efficient method for rasterizing graphics primitives that fully exploits the use of memory tiling within frame buffers.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for rasterizing a primitive wherein pixels are stored in a tile-organized memory, the method comprising:
   a) selecting a smaller tile from smaller tiles included in a larger tile, the selected smaller tile including a vertex of the primitive;
   b) traversing the smaller tiles included in the larger tile, the traversal starting at the selected smaller tile and sequencing through each smaller tile that has one or more memory locations located within the primitive; and
   c) rasterizing each smaller tile encountered during step (b),
   wherein the larger tile is from larger tiles included in a still-larger tile and wherein the method further comprises:
   d) traversing each larger tile in the still larger tile that has one or more memory locations located within the primitive; and
   e) applying steps (a), (b), and (c) to each larger tile encountered during step (d);
   wherein a tile comprises a store of two or more pixels, the tile being addressed using a fractional portion of an address used to access a single pixel, and wherein traversal of the smaller tile, the larger tile and the still-larger tile is performed in order and wherein the traversal excludes tiles that fall entirely outside of the primitive as determined by a rendering apparatus comprising:
   three edge evaluators, each evaluator initialized with an x and y value from the selected small tile including the vertex of the primitive;
   three adder trees, each adder tree re-computing a value received from a respective edge evaluator for each x and y location within the tile being rasterized, and
   an AND function providing a set of values indicative of memory locations within a tile which includes the primitive.

2. A method for rasterizing a primitive wherein pixels are stored in a tile-organized memory, the method comprising:
   a) selecting a smaller tile from smaller tiles included in a larger tile, the larger tile being included in a still-larger tile, the selected smaller tile including a vertex of the primitive;
   b) traversing the smaller tiles included in the larger tile, the traversal starting at the selected smaller tile and sequencing through each smaller tile that has one or more memory locations located within the primitive; and
   c) rasterizing each smaller tile encountered during step (b), wherein the smaller tiles included in the larger tile are arranged as a rectangle or square and the smaller tile, the larger tile and the still-larger tile are each traversed in respective order;

wherein a tile address accesses two or more pixels stored in the tile, and wherein traversal excludes tiles that fall entirely outside of the primitive as determined by a rendering apparatus comprising:

three edge evaluators, each evaluator initialized with an x and y value from the selected small tile including the vertex of the primitive;

three adder trees, each adder tree re-computing a value received from a respective edge evaluator for each x and y location within the tile being rasterized, and an AND function providing a set of values indicative of memory locations within a tile which includes the primitive.

3. A method for rasterizing a primitive in a frame buffer, where the frame buffer is organized as a series of rectangular memory tiles, each memory tile containing two or more pixels, the method comprising:

a) traversing a set of memory tiles that include memory locations within the primitive, wherein the traversing starts in a memory tile including a vertex of the primitive;

b) accessing the memory tiles encountered during step (a) as respective sequences of smaller memory tiles; and c) rasterizing smaller memory tiles within the sequences of smaller memory tiles, wherein the rasterizing the smaller memory tiles further comprises:

accessing the smaller memory tiles as respective sequences of still-smaller memory tiles; and rasterizing the still-smaller memory tiles within the sequences of still-smaller memory tiles;

wherein rasterizing is performed hierarchically according to increasing tile size and wherein the traversing excludes tiles that fall entirely outside of the primitive as determined by a rendering apparatus comprising:

three edge evaluators, each evaluator initialized with an x and y value from the selected small tile including the vertex of the primitive;

three adder trees, each adder tree re-computing a value received from a respective edge evaluator for each x and y location within the tile being rasterized, and an AND function providing a set of values indicative of memory locations within a tile which includes the primitive.

4. A new system for rasterizing graphics primitives in a frame buffer, the system comprising:

a frame buffer organized into memory tiles, the memory tiles each storing at least two pixels, means for accessing at least one memory tile within the frame buffer using one address;

means for accessing memory tiles as sequences of smaller memory tiles; and means for rasterizing the smaller memory tiles within the sequences of smaller memory tiles, the means for rasterizing further comprising means for accessing the smaller memory tiles as respective sequences of still-smaller memory tiles; and means for rasterizing the still-smaller memory tiles within the sequences of still-smaller memory tiles;

wherein rasterizing is performed hierarchically according to increasing tile size such that tiles that fall entirely outside of the primitive are excluded as determined by a rendering apparatus comprising:

three edge evaluators, each evaluator initialized with an x and y value from the selected small tile including the vertex of the primitive;

three adder trees, each adder tree re-computing a value received from a respective edge evaluator for each x and y location within the tile being rasterized, and an AND function providing a set of values indicative of memory locations within a tile which includes the primitive.

* * * * *